US006411828B1

(12) United States Patent
Lands et al.

(10) Patent No.: US 6,411,828 B1
(45) Date of Patent: Jun. 25, 2002

(54) COMMUNICATIONS DEVICES AND METHODS THAT OPERATE ACCORDING TO COMMUNICATIONS DEVICE ORIENTATIONS DETERMINED BY REFERENCE TO GRAVITATIONAL SENSORS

(75) Inventors: Robert Michael Lands; An Tuyen Banh, both of Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/272,926

(22) Filed: Mar. 19, 1999

(51) Int. Cl.[7] ............................. H04B 1/38; H04M 1/00
(52) U.S. Cl. .................. 455/569; 455/550; 379/420.01; 379/388.01; 379/388.02
(58) Field of Search .................................. 455/569, 557, 455/550, 575, 567, 11.1, 462; 379/388.01, 388.02, 388.03, 390.01, 390.03, 420.01, 420.02, 420.03

(56) References Cited

U.S. PATENT DOCUMENTS

| 4,504,701 A | * | 3/1985 | Lucchesi ...................... 179/84 |
| 4,942,605 A | * | 7/1990 | McClain ...................... 379/424 |
| 5,029,205 A |   | 7/1991 | Archer ......................... 379/433 |
| 5,138,651 A | * | 8/1992 | Sudo ............................. 379/61 |
| 5,224,151 A | * | 6/1993 | Bowen et al. .............. 455/569 |

(List continued on next page.)

FOREIGN PATENT DOCUMENTS

| EP | 0 564 160 A2 | 10/1993 |
| EP | 0 682 434 A2 | 11/1995 |
| EP | 0 865 188 A2 | 9/1998 |
| WO | WO 97/13332 | 4/1997 |
| WO | WO 98/26513 | 6/1998 |
| WO | WO 99/45685 | 9/1999 |

OTHER PUBLICATIONS

International Search Report of corresponding PCT/US00/02997, dated Oct. 27, 2000.
Invitation to Pay Additional Fees, PCT/US00/02997, Jul. 28, 2000.
Andrews, et al., "A Comparison of Squeeze–Film Theory with Measurements on a Microstructure," Sensors and Actuators, A.36 (1993), pp. 79–87.
Product Literature, Nortel 922, "Look no hands".

*Primary Examiner*—Dwayne Bost
*Assistant Examiner*—Lewis West
(74) *Attorney, Agent, or Firm*—Myers Bigel Sibley & Sajovec

(57) ABSTRACT

A wireless user terminal operates in a mode that is selected based on an indication of the orientation of the wireless user terminal from a gravitational sensor in the wireless user terminal. When the wireless user terminal is in a first orientation, the wireless user terminal operates in a speakerphone mode. When the wireless user terminal is in a second orientation, the wireless user terminal operates in a handset mode. The mode of operation of the wireless user terminal transitions based on movement of the wireless user terminal from the first orientation to the second orientation. For example, when the wireless user terminal placed in a horizontal orientation, one of the speakerphone modes is selected. When the user picks up the wireless user terminal, the wireless user terminal transitions to handset mode. In a personal speakerphone mode, the volume to a handset speaker in the wireless user terminal is increased so that a call may be carried on without holding the wireless user terminal near the user's ear and mouth. In a conference speakerphone mode, the wireless user terminal transmits/receives audio signals to/from an external speaker and external microphone.

41 Claims, 7 Drawing Sheets

U.S. PATENT DOCUMENTS

| | | | | |
|---|---|---|---|---|
| 5,426,689 A | * | 6/1995 | Griffith et al. | 455/568 |
| 5,588,041 A | * | 12/1996 | Meyer, Jr. et al. | 379/59 |
| 5,679,895 A | | 10/1997 | von Windheim | 73/514.25 |
| 5,729,604 A | | 3/1998 | Van Schyndel | 379/388 |
| 5,758,267 A | * | 5/1998 | Pinder et al. | 341/20 |
| 5,818,924 A | | 10/1998 | King et al. | 379/389 |
| 5,828,965 A | | 10/1998 | Brown et al. | 455/550 |
| 5,867,794 A | * | 2/1999 | Hayes et al. | 455/557 |
| 6,144,864 A | * | 11/2000 | Lands et al. | 455/569 |
| 6,321,080 B1 | * | 11/2001 | Diethorn | 455/416 |
| 6,334,063 B1 | * | 12/2001 | Charlier et al. | 345/7 |
| 6,360,104 B1 | * | 3/2002 | Budd et al. | 379/93.17 |

* cited by examiner

COMMUNICATIONS DEVICES AND METHODS THAT OPERATE ACCORDING TO COMMUNICATIONS DEVICE ORIENTATIONS DETERMINED BY REFERENCE TO GRAVITATIONAL SENSORS

FIELD OF THE INVENTION

The present invention relates to the field of communications in general and more particularly to wireless communications.

BACKGROUND OF THE INVENTION

Some conventional telephone handsets may provide the option of using the telephone handset in handset mode or personal speakerphone mode. In handset mode, the telephone handset may reproduce and provide audio signals based on a presumed proximity of the handset to the user. For example, while being used in handset mode the speaker in the telephone handset may be located near the user's ear. Consequently, the audio signal produced by the speaker may be amplified to provide a sound level that is appropriate given the proximity of the users ear. Similarly, the speech received via a microphone in the telephone handset may be processed with the assumption that the user's mouth is near the microphone.

In personal speakerphone mode, the telephone handset may reproduce and provide audio signals based on a presumption that the handset is not located near the user. For example, in personal speakerphone mode the telephone handset may be located on a table so that the user's hands are free to perform other tasks during a call.

It is known to transition between personal speakerphone mode and handset mode based on a determined change in the proximity to the user. For example, as discussed in U.S. Pat. No. 5,224,151 to Bowen et al. entitled Automatic Handset-Speakerphone Switching Arrangement for Portable Communications Device, a telephone handset operates in speakerphone mode and handset mode, wherein the telephone handset transitions between the two modes based on the distance between the handset and the user's ear. For example, the telephone handset described in Bowen et al. may include an infrared emitter that transmits infrared light which is reflected from the user when the telephone handset is near the user's ear (such as about 5 centimeters from the user's ear). The reflected infrared light is detected by an infrared sensor which indicates that the telephone handset should transition from personal speakerphone mode to handset mode, wherein the volume of the sound generated by the speaker is reduced.

Unfortunately, the telephone handset described in Bowen et al. may create some user discomfort. For example, the infrared sensor may indicate that the mode of operation of the telephone handset should transition at a range of about 5 cm from the user and reduce the volume of the sound. At a range of 5 cm, however, the user may perceive the volume of the sound produced in personal speakerphone mode before the transition to handset mode as too loud for comfortable use. Moreover, inaccuracies in the infrared sensing may cause the telephone handset to transition from personal speakerphone mode to handset mode at a range closer than 5 cm to the user, thereby possibly causing further discomfort to the user. In view of the above, there is a need to provide telephone handsets with improved speakerphone capabilities.

SUMMARY OF THE INVENTION

It is, therefore, an object of the present invention to provide improved communications devices and methods.

It is a further object of the present invention to provide communications devices and methods that can provide improved speakerphone operations.

It is yet another object of the present invention to provide communications devices and methods that can improve a quality of sound during speakerphone operations.

These and other objects of the present invention are provided by a communications device that operates in a mode that is selected based on an indication of the orientation of the communications device from a gravitational sensor in the communications device. In particular, the communications device includes a processor, responsive to the gravitational sensor, wherein the processor provides a speakerphone mode of operation when the processor determines a first orientation of the communications device based on a first indication from the gravitational sensor. The processor provides a handset mode of operation when the processor determines a second orientation of the communications device based on a second indication from the gravitational sensor.

In particular, when the communications device is in the first orientation, the communications device operates in one of two speakerphone modes: personal speakerphone mode or conference speakerphone mode. In a preferred embodiment, the first orientation of the communications device is substantially horizontal. When the communications device is in the second orientation, the communications device operates in the handset mode. In a preferred embodiment, the second orientation is substantially vertical.

The mode of operation of the communications device transitions from the selected speakerphone mode to handset mode of operation based on the movement of the communications device from the first orientation to the second orientation. For example, when the communications device is placed in a horizontal orientation, one of the speakerphone modes is selected. When the user picks up the communications device, the communications device transitions to handset mode. In particular, the volume to a handset speaker in the communications device can be increased so that a call may be carried on without holding the communications device near the user's ear and mouth. Alternately, the communications device can include a speakerphone speaker (separate from a handset speaker) that produces sounds in speakerphone mode of operation.

According to a further aspect of the present invention, the communications device can operate in a conference speakerphone mode wherein the communications device transmits and receives audio signals to and from an external speaker and external microphone respectively. In particular, the audio signals can be transmitted to/from the external speaker and microphone via an RF wireless communications link.

The external speaker may provide improved sound quality when the communications device operates in conference speakerphone mode. In particular, as the sizes of telephone handsets are reduced, smaller internal speakers may be used. Small speakers, however, may produce low sound quality when the audio signal is reproduced at the higher volumes used in conference speakerphone mode. The external speaker can thus be sized to provide improved sound quality at the higher volumes used in the conference speakerphone mode.

DETAILED DESCRIPTION OF THE PREFERRED EMBODIMENTS OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described herein with reference to wireless user terminals in a cellular communications system. It will be understood however that the scope of the present invention includes communication devices in communications systems such as public switched telephone networks, terrestrial cellular radio systems such as DAMPS and GSM, and satellite communications systems such as ACeS. The wireless user terminals described herein may be used to initiate calls and receive calls to and from other users of the communications systems. As will be appreciated by one of skill in the art, the present invention may be embodied as methods or devices. Accordingly, the present invention may take the form of a hardware embodiment, a software embodiment or an embodiment combining software and hardware aspects. It will be understood that although the present invention is described by reference to the transmission, reception and processing of audio signals, the scope of the present invention includes other types of communications signals.

Figure 1:
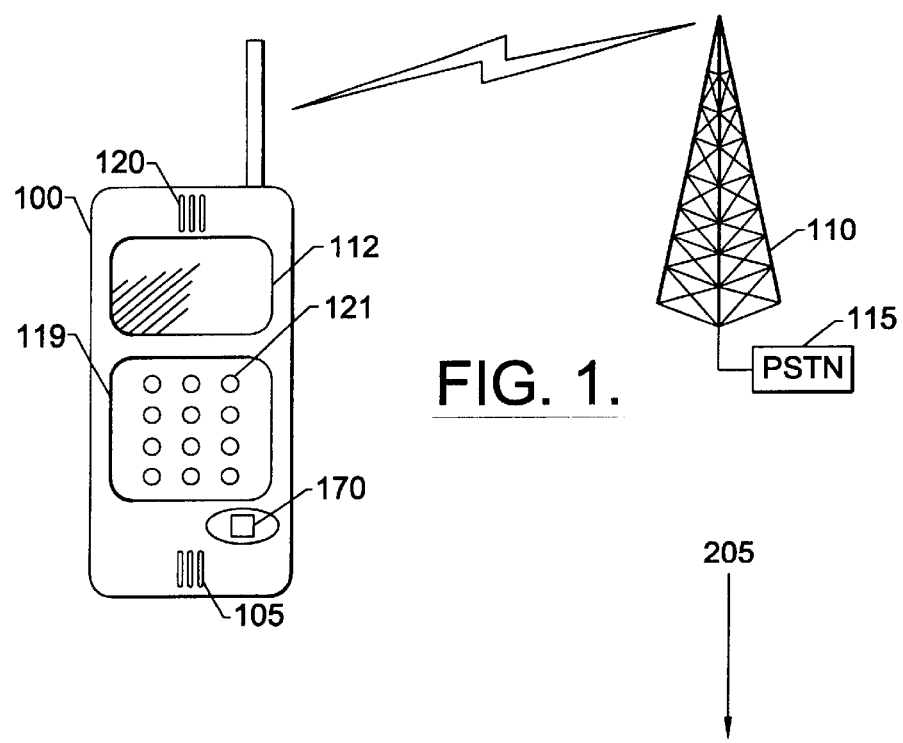
FIG. 1 illustrates a cellular communications system according to the present invention.

FIG. 1 is a block diagram that illustrates a cellular communications system including a wireless user terminal 100 that communicates with a base station 110 which transmits/receives signals to/from the wireless user terminal 100. The base station 110 communicates with a public switched telephone network in which callers can communicate with wireless user terminals in the cellular communications system.

The cellular communications system provides service which enables the wireless user terminal 100 to originate and receive calls. For example, when a caller in the public switched telephone network 115 places a call to the wireless user terminal 100, the wireless user terminal 100 is paged by transmitting a signal to the wireless user terminal 100. After the wireless user terminal 100 is paged, the call is established between the caller in the public switched telephone network 115 and the wireless user terminal 100. During the call, the user speaks into a microphone 105 which causes the wireless user terminal 100 to generate audio signals which are transmitted to the caller and the user listens to a speaker 120 that reproduces audio signals generated by the caller and received by the wireless user terminal 100. During operation, the user may refer to a display 112 included on the wireless user terminal 100. The display may also be used in conjunction with buttons 121 on a keypad 119 such as when the user dials a number to place a call. The microphone, speaker, keypad, display and gravitational sensor are coupled to a processor that controls operations of the user terminal.

According to the present invention, the wireless user terminal 100 generates transmit (TX) audio signals for transmission to the caller and reproduces receive (RX) audio signals received from the caller in handset mode or speakerphone mode. The mode of operation of the wireless user terminal 100 is selected based on the orientation of the wireless user terminal 100 in a gravitational field such as the gravitational field of the earth.

Figure 2A:
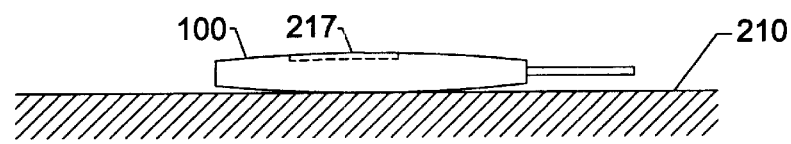
FIGS. 2A and 2B illustrate first and second orientations of wireless user terminals according to the present invention.
Figure 2B:
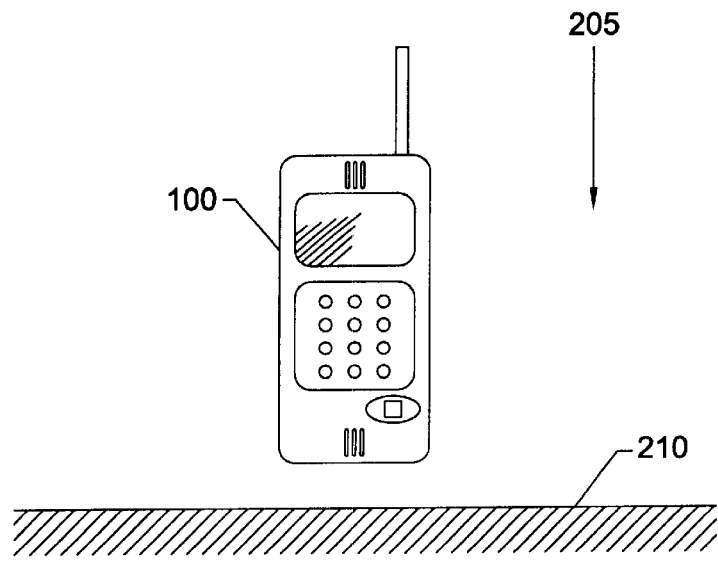

FIGS. 2A and 2B illustrate operations of the wireless user terminal 100 selected based on an orientation of the wireless user terminal 100 determined by reference to a gravitational field 205. According to FIG. 2A, the wireless user terminal 100 operates in speakerphone mode when the wireless user terminal 100 is in a first orientation such as when the wireless user terminal 100 is substantially horizontal on a surface 210. The first orientation of the wireless user terminal 100 is detected using a gravitational sensor 170 included in the wireless user terminal 100. The wireless user terminal 100 operates in speakerphone mode in the first orientation until the wireless user terminal 100 is reoriented.

According to FIG. 2B, the wireless user terminal 100 operates in a handset mode when the wireless user terminal 100 is in a second orientation. The second orientation of the wireless user terminal 100 is detected using the gravitational sensor 170 in the wireless user terminal 100. In handset mode the user speaks into the microphone 105 and listens to the speaker 120. In a preferred embodiment, the second orientation is where the wireless user terminal 100 is held so that a face of a speaker 120 in the wireless user terminal 100 is substantially parallel to a direction of a gravitational field 205. For example, the second orientation may occur when the user holds the wireless user terminal 100 so that the face of the speaker 120 is near the user's ear and the microphone 105 is near the user's mouth. This second orientation will be referred to as being substantially vertical.

When the user moves the wireless user terminal 100 from the first orientation to the second orientation, the operation of the wireless user terminal 100 transitions from speakerphone mode to handset mode. The transition of the wireless user terminal 100 from the first to the second orientation is detected using the gravitational sensor 170 when the wireless user terminal 100 is moved more than a threshold amount from the first substantially horizontal orientation. In a preferred embodiment, the threshold amount can be programmed by the user.

Figure 2C:
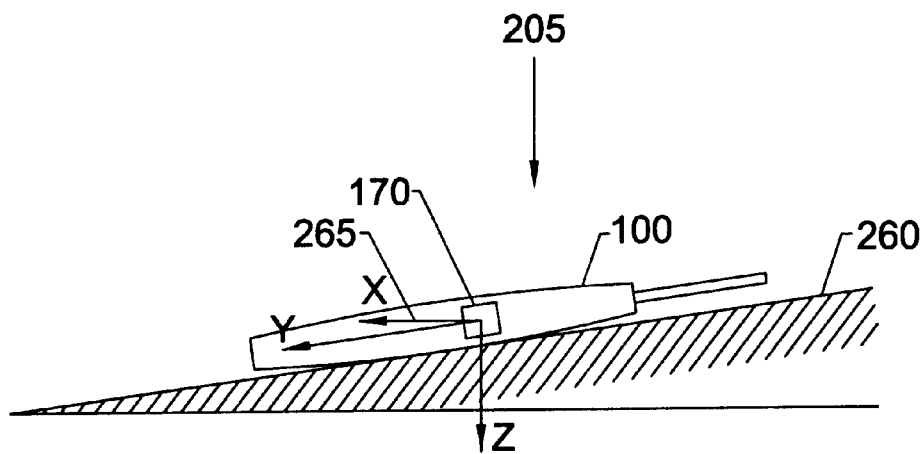
FIGS. 2C and 2D illustrate frames of reference for wireless user terminals according to the present invention.
Figure 2D:
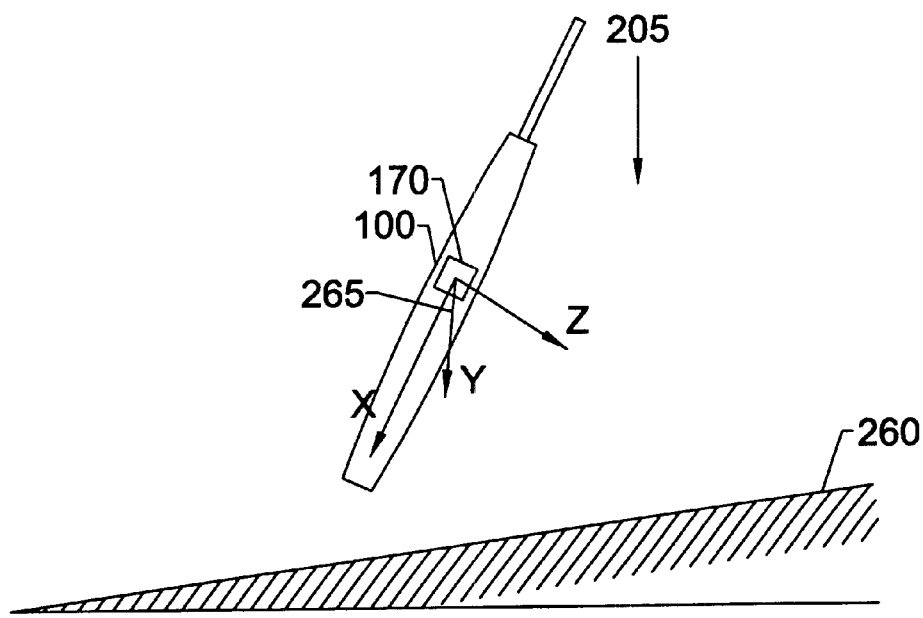

FIGS. 2C and 2D are diagrams illustrating a frame of reference 265 defined for the wireless user terminal 100. The frame of reference 265 is used to determine if the wireless user terminal 100 has moved more than the threshold amount from the first orientation so that the mode of operation should transition as described above. According to FIG. 2C, the wireless user terminal 100 is placed on an inclined surface 260 and the user pushes a button on the keypad 119. Pushing the button causes the gravitational sensor 170 and/or the processor in the wireless user terminal 100 to sense a first direction of the gravitational field 205 relative to the terminal whereupon the frame of reference 265 for the wireless user terminal 100 is defined with respect to the direction of the gravitational field 205 and operations in the selected speakerphone mode begin. The frame of reference 265 establishes the first orientation from which subsequent movement of the wireless user terminal 100 is measured. The frame of reference 265 can be defined using a set of x, y, and z axes.

According to FIG. 2D, the wireless user terminal 100 is moved to the second orientation whereupon the gravitational sensor 170 and/or processor sense a second direction of the gravitational field with respect to the wireless user terminal 100. The difference in the first and second directions of the gravitational field 205, as sensed using the gravitational sensor 170 and/or processor with respect to the wireless user terminal 100, is used to determine the wireless user terminal 100. If the terminal is moved more than a threshold amount, the mode of operation of the wireless user terminal 100 transitions from the selected speakerphone mode to handset mode. In a preferred embodiment, the threshold amount is about a 10° change between the first and second directions of the gravitational field 205 with respect to the wireless user terminal 100.

Figure 3A:
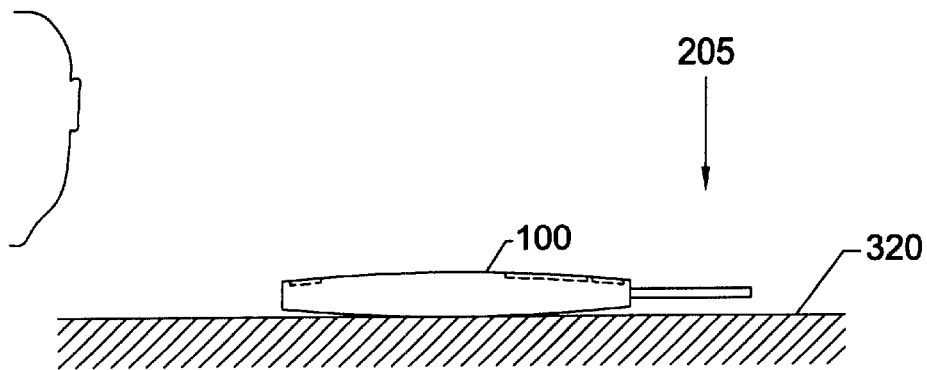
FIG. 3A illustrates operations of a wireless user terminal in personal speakerphone mode according to the present invention.
Figure 3B:
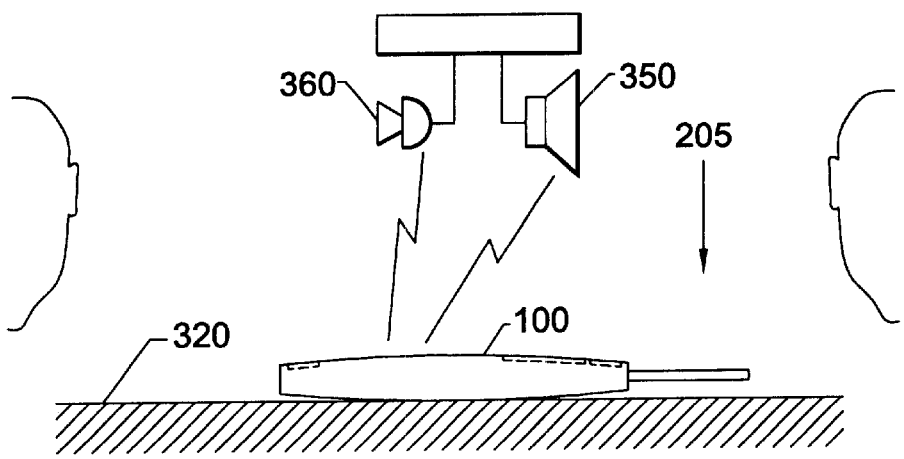
FIG. 3B illustrates operations of a wireless user terminal in conference speaker mode operation according to the present invention.

FIGS. 3A and 3B illustrate operations of wireless user terminals 100 in a preferred speakerphone mode selected by the user. In particular, speakerphone mode includes personal speakerphone mode and conference speakerphone mode. FIG. 3A illustrates operations of the wireless user terminal 100 in personal speakerphone mode according to the present invention. As shown in FIG. 3A, the wireless user terminal 100 begins operation in personal speakerphone mode when the wireless user terminal 100 is placed in the first orientation on a surface 320 such that the face of the speaker 120 in the wireless user terminal 100 is substantially orthogonal to the gravitational field 205 and the button 235 on the keypad 119 of the wireless user terminal 100 is pushed.

During personal speakerphone mode of operation, the user need not speak directly into the microphone 105 or listen directly to the speaker 120. Rather, the user may be positioned near the wireless user terminal 100, such as seated at a table upon which the wireless user terminal 100 is placed in the first orientation. When the user speaks into the wireless user terminal 100 operating in personal speakerphone mode a respective TX audio signal is generated and transmitted to the caller as described above. When audio signals are received from the caller, the RX audio signals are amplified and reproduced by the speaker 120 so that the user can hear the caller even though the speaker is not placed directly adjacent to user's ear.

As shown in FIG. 3B, the wireless user terminal 100 begins operations in conference speakerphone mode by placing the wireless user terminal 100 in the first orientation on the surface 320 such that the face of the speaker 120 in the wireless user terminal 100 is substantially orthogonal to the gravitational field 330 and pushing the button 236 on the keypad 119 of the wireless user terminal 100.

In conference speakerphone mode of operation, audio signals received by the wireless user terminal 100 are transmitted to an external speaker 350 which reproduces the RX audio signals. When the user speaks, an external microphone 360 transmits a corresponding audio signal to the wireless user terminal 100. The wireless user terminal 100 transmits the audio signal received from the external microphone to the caller as described above. In conference speakerphone mode of operation, the user need not speak directly into the external microphone 360 or listened directly to the external speaker 350. For example, the user may be located in the same room with the wireless user terminal 100 and the external microphone 360 and external speaker 350.

The external speaker 350 may provide improved sound quality when the wireless user terminal 100 operates in conference speakerphone mode. In particular, as the size of telephone handsets are reduced smaller speakers may be used. Unfortunately, a small speaker may produce low quality sound when the audio signal is reproduced at the higher amplification levels used in conference speakerphone mode.

Figure 4A:
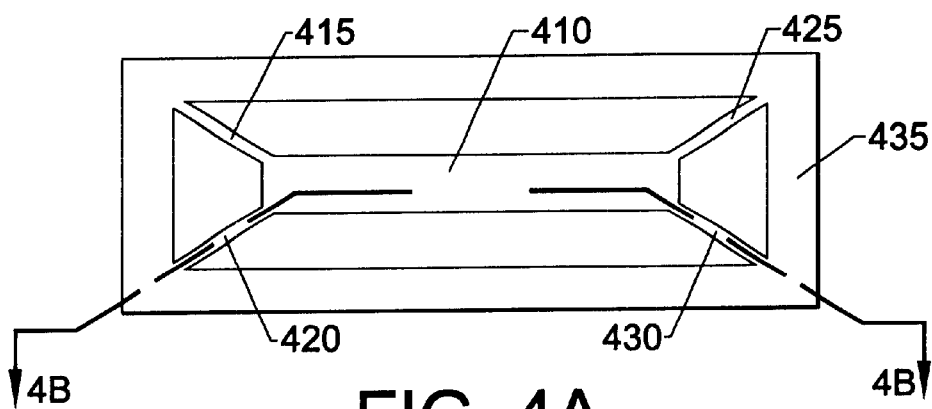
FIGS. 4A and 4B illustrate respective top and cross-sectional views of a gravitational sensor according to the present invention.

FIG. 4A is an enlarged top view of an accelerometer 405 that can be used as the gravitational sensor 120 in the wireless user terminal 100. According to FIG. 4A, a mass 410 is formed from a substrate material 435 wherein a plurality of struts 415, 420, 425, 430 are formed to suspend the mass 410 from the substrate material 435. In a preferred embodiment the thickness of the struts 415, 420, 425, 430 is relatively small compared to the thickness of the mass 410.

Figure 4B:
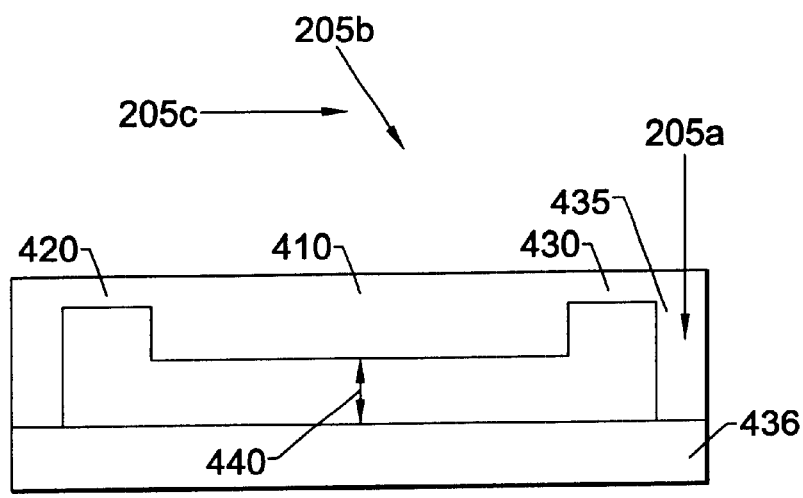

FIG. 4B is an enlarged cross-sectional view of the accelerometer 405 shown in FIG. 4A, taken along section line 4B. According to FIG. 4B, the struts 415, 420, 425, 430 deflect under the force that results from the mass 410 and struts being oriented orthogonal to the gravitational field 205, thereby reducing the distance 440 between the second substrate 436 and the mass 410. The distance 440 can be related to the direction of the gravitational field 205a, 205b, 205c with respect to the wireless user terminal 100 using techniques known to those having skill in the art. The distance 440 depends on the orientation of the accelerator with respect to the gravitational field 205a, 205b, 205c. In particular, the direction of the gravitational field 205a causes a first distance 440, the direction of the gravitational field 205b causes a second distance 440 which is more than the first distance 440, and the direction of the gravitational field 205c covers a third distance 440 which is more than the second distance.

Accelerometers and techniques used to indicate forces are discussed in U.S. Pat. No. 5,679,895 to von Windheim entitled Diamond Field Emission Acceleration Sensor, and in A Comparison of Squeeze-Film Theory with Measurements on a Microstructure by M. Andrews et al., Sensors and Actuators, A.36 (1993) pp. 79–87 which are incorporated herein by reference. It will also be understood that other devices may be used to sense the direction of the gravitational field 205 with respect to the wireless user terminal 100. For example, the gravitational sensor 170 may comprise a liquid switch (such as a mercury switch) or other devices which exhibit analogous behavior in the gravitational field 205. It will be understood that a plurality of gravitational sensors 170 may be included in the wireless user terminal 100 to indicate movement of the wireless user terminal 100 in three dimensions.

When using a microelectromechanical systems (MEMS) accelerometer, any technique know to those having skill in the art can be used to measure movement of the mass relative to the second substrate as the orientation of the mass in the gravitational field changes. For example, piezoelectric, capacitance, etc. measurement techniques can be used.

It will be further understood that the processor can be defined to include the gravitational sensor. For example, the gravitational sensor and the processor can be formed on a common semiconductor substrate. Alternately, the gravitational sensor can be defined to include a portion of the processor. For example, electronic processing devices can be provided with the gravitational sensor.

Figure 5A:
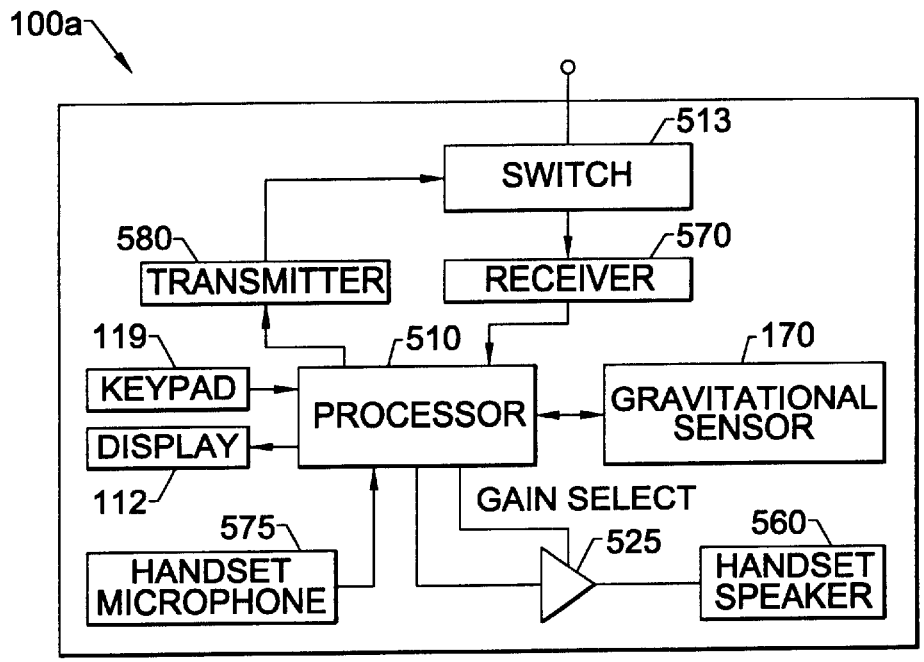
FIG. 5A is a block diagram of a first wireless user terminal according to the present invention.

FIG. 5A is a block diagram of a first wireless user terminal 100a according to the present invention. According to FIG. 5A, the wireless user terminal 100a receives transmitted audio signals from a calling/called communications device via a receiver 570 through a switch 513 to provide RX audio signals. A microphone 575 creates TX audio signals when the user speaks into the microphone 575. The TX audio signals are transmitted to a calling/called communications device via a transmitter 580 through the switch 513.

The gravitational sensor 170 senses the direction of the gravitational field with respect to the wireless user terminal 100a and provides an indication thereof to a processor 510. The processor 510 determines the orientation of the wireless user terminal 100a with respect to the direction of the gravitational field 205 based on the indication from the gravitational sensor 170. For example, the processor 510 uses the indication from the gravitational sensor 170 to determine whether the wireless user terminal 100a is oriented substantially horizontally or vertically.

The processor 510 uses the determined orientation to set the gain of an amplifier 525 that amplifies the RX audio signals provided to the amplifier 525 by the processor 510. The amplified RX audio signals are provided to an internal handset speaker 560. For example, if the wireless user terminal 100a is in the substantially horizontal orientation, the processor 510 increases the gain of the amplifier 525 so that the handset speaker 560 produces sound which is of an appropriate volume for personal speakerphone mode of operation. If the wireless user terminal 100a is in the substantially vertical orientation, the processor reduces the gain of the amplifier 525 so that the handset speaker 560 produces sound of appropriate volume for handset mode of operation.

Figure 5B:
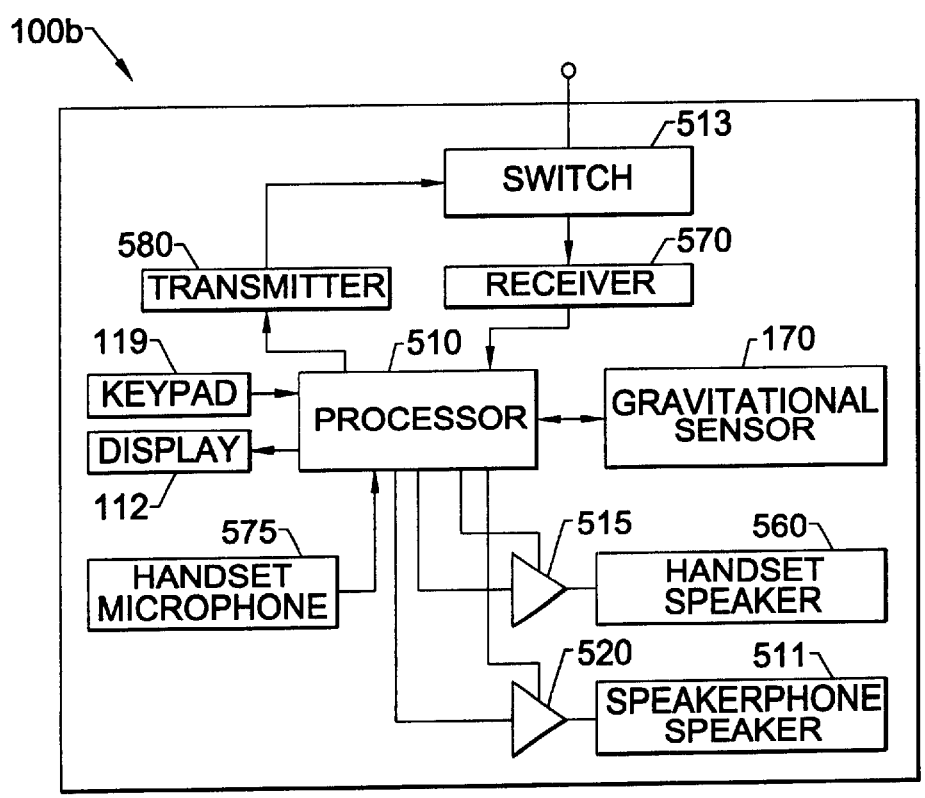
FIG. 5B is a block diagram of a second wireless user terminal according to the present invention.

FIG. 5B is a block diagram of a second embodiment of the wireless user terminal 100b according to the present invention. According to FIG. 5B, the wireless user terminal 100b includes an internal handset speaker 560 and an internal speakerphone speaker 511. The processor 510 determines the orientation of the wireless user terminal 100b by using the gravitational sensor 170. The processor 510 selects whether the RX audio signal is provided to the handset speaker 560 or the speakerphone speaker 511 based on the determined orientation. For example, if the wireless user terminal 100b is vertically oriented, the processor enables the amplifier 515 (i.e., handset) which amplifies the RX audio signal provided by the processor 510 according to handset mode operation. If the wireless user terminal 100b is horizontally oriented, the processor 510 enables a speakerphone amplifier 520 which amplifies the RX audio signal according to personal speakerphone mode of operation. In particular, the size of the speakerphone speaker 511 is selected to provided adequate audio reproduction for speakerphone mode of operation.

Figure 5C:
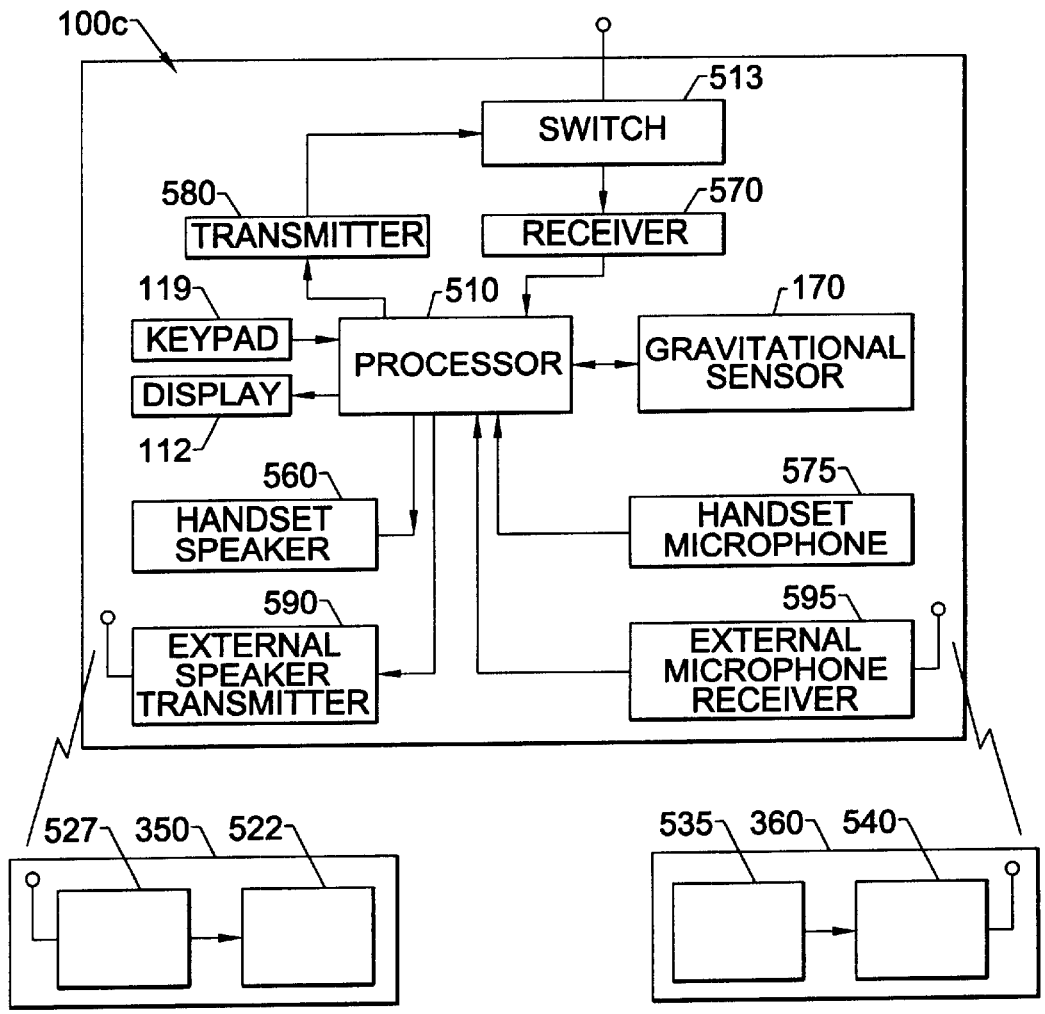
FIG. 5C is a block diagram of a third wireless user terminal according to the present invention.

FIG. 5C is a block diagram of a third embodiment of the wireless user terminal 100c according to the present invention. According to FIG. 5C, the wireless user terminal includes an external speaker transmitter 590 and an external microphone receiver 595. The processor 510 determines the orientation of the wireless user terminal 100c by reference to the gravitational sensor 170. The processor 510 provides the RX audio signal to the handset speaker 575 or the external speaker transmitter 590 for transmission to an external speaker 350 based on the determined orientation of the wireless user terminal 100c. The processor 510 also provides the TX audio signal from the handset microphone 575 or the external microphone 360 based on the determined orientation of the wireless user terminal 100c.

If the wireless user terminal 100c is vertically oriented, the processor 510 provides the RX audio signal to the handset speaker 560. If the wireless user terminal 100c is horizontally oriented, the processor 510 provides the RX audio signal to the external speaker transmitter 590 for transmission to the external speaker 350. The external speaker 350 receives the transmitted RX audio signal from the external speaker transmitter 590 and reproduces the audio signal transmitted by the caller. The external speaker 350 comprises an external speaker receiver 527 and a conference speaker 522 which is suitable for conference speakerphone mode operation as described above. In a preferred embodiment, the RX audio signal is transmitted by the external speaker transmitter 590 to the external speaker receiver 527 via a Radio Frequency (RF) signal. The RX audio signal may also be transmitted using other techniques known to those having skill in the art such as with infrared light.

If the wireless user terminal 100c is vertically oriented, the processor 510 provides the TX audio signal from the handset microphone 575 to the transmitter 580. If the wireless user terminal 100 is horizontally oriented, the TX audio signal is provided by the external microphone 360 via the external microphone receiver 595. In particular, the user's speech is received by a conference microphone 535 in the external microphone 360 and transmitted via an external microphone transmitter 540 in the external microphone 360 to the external microphone receiver 595 in the wireless user terminal 100c which is provided to the transmitter 580.

According to the present invention, a wireless user terminal operates in a mode that is selected based on an indication of the orientation of the wireless user terminal using the gravitational sensor in the wireless user terminal. The wireless user terminal can also operate in conference speakerphone mode wherein the wireless user terminal transmits and receives audio signals to and from the external speaker and external microphone respectively. However, it will be understood that the present invention may be utilized to provide a wireless user terminal that includes a gravitational sensor to indicate the orientation of the wireless user terminal but that does not operate in conference speakerphone mode. Alternately, the present invention may be utilized to provide a wireless user terminal that operates in conference speakerphone mode but does not include a gravitational sensor that indicates the orientation of the wireless user terminal.

Wireless user terminals according to the present invention may therefore provide the advantage of automatically transitioning from the selected speakerphone mode of operation to handset operation based on the orientation of the wireless user terminal. Accordingly, the present invention may provide an improvement in the ease of use of speakerphone mode in the wireless user terminal. Moreover, the wireless user terminal according to the present invention may avoid discomfort to the user by detecting movement from the first orientation of the wireless user terminal and switching to the handset mode of operation. It may therefore be less likely that the wireless user terminal is placed near the user's ear while operating in either personal speakerphone mode or conference speakerphone mode. In addition, once the wireless user terminal transitions from the selected speakerphone mode to handset mode of operation, the operation of the wireless user terminal may not reinitiate operations in selected speakerphone mode of operation. For example, after moving the wireless user terminal from the first orientation to the second orientation, if the wireless user terminal is again placed in a first orientation, operations in the speakerphone mode of operation may not be reinitiated. Consequently, speakerphone mode may not be reinitiated while the user is operating the wireless user terminal in handset mode and inadvertently reorients the wireless user terminal such that the wireless user terminal is reoriented in the first orientation.

Figure 6:
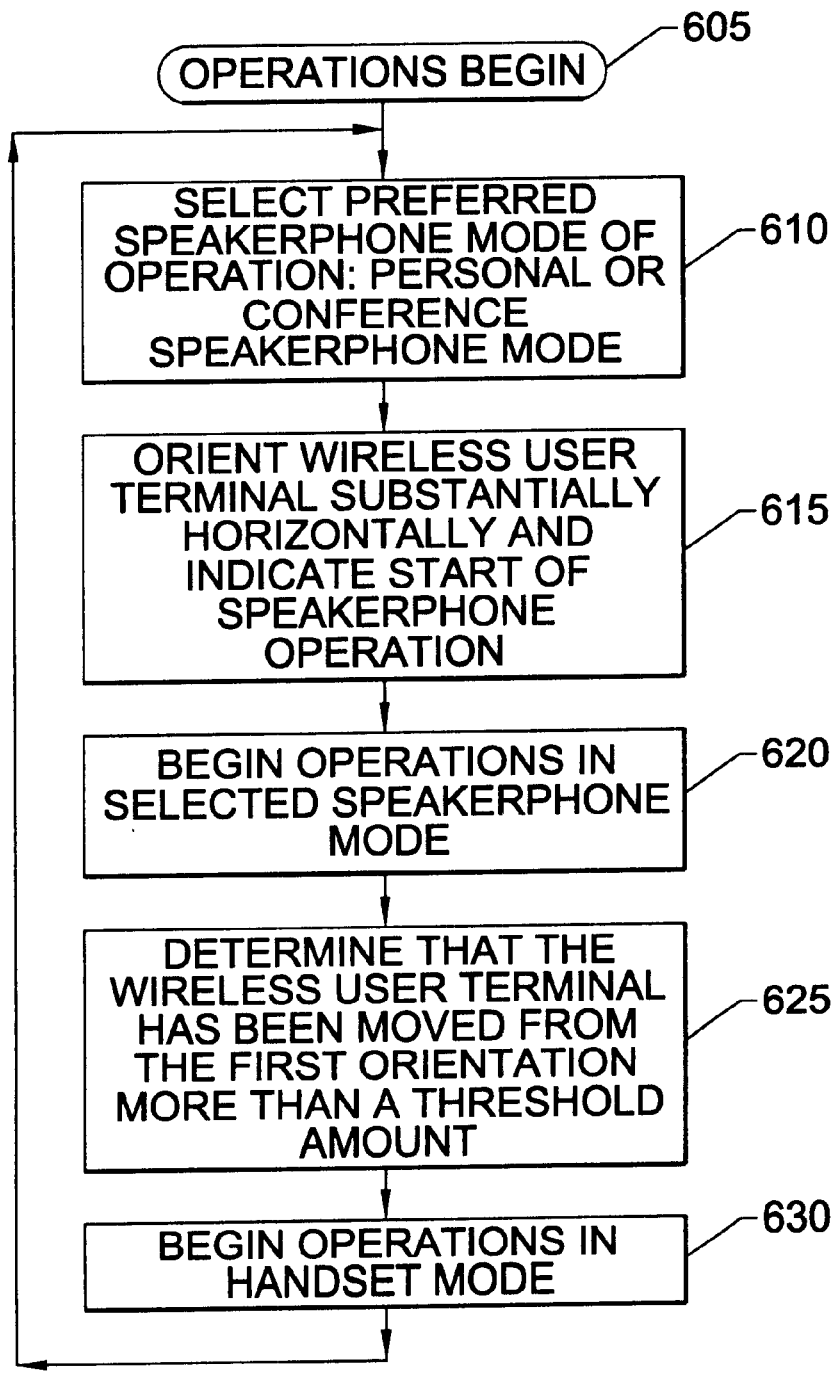
FIG. 6 is a flowchart that illustrates operations of a wireless user terminal according to the present invention.

FIG. 6 is a flowchart that illustrates operations of a wireless user terminal according to the present invention. Operations begin in block 605 wherein the user selects either personal or conference speakerphone mode as the preferred speakerphone mode of operation (block 610). The wireless user terminals is oriented in a substantially horizontal position and the user indicates the start of the selected speakerphone mode of operation (block 615). For example, if the user selects personal speakerphone mode as the preferred speakerphone mode of operation, pushing a button on the wireless user terminal indicates that the wireless user terminal should begin operations in the personal speakerphone mode. The wireless user terminal defines the substantially horizontal position as a first orientation of the wireless user terminal and defines a frame of reference from which movement is determined (block 615).

The wireless user terminal begins operations in the selected speakerphone mode (block 620). If the wireless user terminal is moved from the first orientation more than the threshold amount (block 625), the operation of the wireless user terminal transitions to handset mode (block 630) and operations continue at block 610.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A communications device providing handset mode operation and speakerphone mode operation, said communications device comprising:

a gravitational sensor that senses first and second directions of a gravitational field relative to the communications device in respective first and second orientations of the communications device relative to the gravitational field; and a processor, responsive to the gravitational sensor, that selects speakerphone mode of operation for the communications device when the gravitational sensor senses the first direction of the gravitational field relative to the communications device in the first orientation of the communications device relative to the gravitational field and that selects handset mode of operation for the communications device when the gravitational sensor senses the second direction of the gravitational field relative to the communications device in the second orientation of the communications device relative to the gravitational field, wherein the processor determines that a difference between the first and second orientations of the communications device is greater than a programmable threshold.

2. The communications device of claim 1, wherein the mode of operation of the communications device changes from speakerphone mode of operation to handset mode of operation when the processor determines that the communications device has moved from the first orientation to the second orientation.

3. The communications device of claim 1 further comprising:

a receiver, coupled to the processor, that receives audio signals from a remote communications device to provide received audio signals;

an amplifier, responsive to the processor, that amplifies the received audio signals by applying first and second amplifier gains to the amplifier to provide amplified audio signals, wherein the first amplifier gain is applied to the received audio signals when the communications device operates in speakerphone mode and wherein the second amplifier gain is applied to the received audio signals when the communications device operates in handset mode; and a speaker, responsive to the amplifier, that reproduces sounds from the amplified audio signals.

4. The communications device of claim 1 further comprising:

a receiver, coupled to the processor, that receives audio signals from a remote communications device to provide received audio signals;

a handset speaker, coupled to the processor, that reproduces sounds from the received audio signals when the communications device operates in handset mode; and a speakerphone speaker, coupled to the processor, that reproduces sounds from the received audio signals when the communications device operates in speakerphone mode.

5. The communications device of claim 1 further comprising:

a receiver, coupled to the processor, that receives audio signals from a remote communications device to provide received audio signals;

a handset speaker, coupled to the processor, that reproduces sounds from the received audio signals when the communications device operates in handset mode; and an external speaker transmitter, coupled to the processor, that wirelessly transmits the received audio signals when the communications device operates in speakerphone mode.

6. The communications device of claim 5 further comprising:

an internal microphone, coupled to the processor, that provides transmit audio signals in response to sounds, wherein the transmit audio signals are transmitted to the remote communications device when the communications device operates in the handset mode; and an external microphone receiver, coupled to the processor, that receives wireless transmissions when the communications device operates in the speakerphone mode.

7. A communications device providing handset mode operation and speakerphone mode operation, said communications device comprising:

a gravitational sensor that senses first and second directions of a gravitational field relative to the communications device in respective first and second orientations of the communications device relative to the gravitational field;

a processor, responsive to the gravitational sensor, that selects speakerphone mode of operation for the communications device when the gravitational sensor senses the first direction of the gravitational field relative to the communications device in the first orientation of the communications device relative to the gravitational field and that selects handset mode of operation for the communications device when the gravitational sensor senses the second direction of the gravitational field relative to the communications device in the second orientation of the communications device relative to the gravitational field; and wherein the mode of operation of the communications device changes from speakerphone mode of operation to handset mode of operation when the processor determines that the communications device has moved from the first orientation to the second orientation, wherein the processor determines that a difference between the first and second orientations of the communications device is greater than a programmable threshold.

8. The communications device of claim 7, wherein the programmable threshold is about equal to a 10° change between the first and second directions of the gravitational field relative to the communications device in the respective first and second orientations.

9. A communications device that operates in handset mode and conference speakerphone mode, the communications device comprising:

a receiver that receives audio signals from a remote communications device to provide received audio signals;

a processor, coupled to the receiver, that processes the received audio signals from the remote communications device and wherein the processor selects one of handset mode and conference speakerphone mode in response to the processor determining that a difference between first and second orientations of the communications device is greater than a programmable threshold;

an internal handset speaker, coupled to the processor, that reproduces sounds from the received audio signals when the processor selects handset mode; and an external speaker transmitter, coupled to the processor, wherein the external speaker transmitter wirelessly transmits the received audio signals to an external speakerphone speaker remote from the communications device when the processor selects conference speakerphone mode.

10. The communications device of claim 9 further comprising:

a gravitational sensor, coupled to the processor, that senses first and second directions of a gravitational field relative to the communications device in respective first and second orientations of the communications device relative to the gravitational field, wherein the processor selects the conference speakerphone mode of operation for the communications device when the gravitational sensor senses the first direction of the gravitational field relative to the communications device in the first orientation of the communications device relative to the gravitational field and wherein the processor selects the handset mode of operation for the communications device when the gravitational sensor senses the second direction of the gravitational field relative to the communications device in the second orientation of the communications device relative to the gravitational field.

11. The communications device of claim 9 further comprising:

a handset microphone, coupled to the processor, that provides transmit audio signals in response to sounds, wherein the transmit audio signals are transmitted to the remote communications device when the communications device operates in the handset mode; and an external microphone receiver that receives wireless transmissions from an external microphone remote from the communications device, wherein the received wireless transmissions are transmitted to a remote communications device when the processor selects conference speakerphone mode.

12. A communications device that operates in handset mode and conference speakerphone mode, the communications device comprising:

a receiver that receives audio signals from a remote communications device to provide received audio signals;

a processor, coupled to the receiver, that processes the received audio signals from the remote communications device and wherein the processor selects one of handset mode and conference speakerphone mode;

an internal handset speaker, coupled to the processor, that reproduces sounds from the received audio signals when the processor selects handset mode;

an external speaker transmitter, coupled to the processor, wherein the external speaker transmitter wirelessly transmits the received audio signals to an external speakerphone speaker remote from the communications device when the processor selects conference speakerphone mode; and a gravitational sensor, coupled to the processor, that senses first and second directions of a gravitational field relative to the communications device in respective first and second orientations of the communications device relative to the gravitational field, wherein the processor selects the conference speakerphone mode of operation for the communications device when the gravitational sensor senses the first direction of the gravitational field relative to the communications device in the first orientation of the communications device relative to the gravitational field and wherein the processor selects the handset mode of operation for the communications device when the gravitational sensor senses the second direction of the gravitational field relative to the communications device in the second orientation of the communications device relative to the gravitational field, wherein the processor determines that a difference between the first and second orientations of the communications device is greater than a programmable threshold.

13. The communications device of claim 12, wherein the programmable threshold is about equal to a 10° change between the first and second directions of the gravitational field relative to the communications device in the respective first and second orientations.

14. A method of providing handset mode operation and speakerphone mode operation in a communications device, the method comprising the steps of:

sensing first and second directions of a gravitational field relative to the communications device in respective first and second orientations of the communications device relative to the gravitational field; and selecting speakerphone mode of operation for the communications device when the gravitational sensor senses the first direction of the gravitational field relative to the communications device in the first orientation of the communications device relative to the gravitational field and selecting handset mode of operation for the communications device when the gravitational sensor senses the second direction of the gravitational field relative to the communications device in the second orientation of the communications device relative to the gravitational field, wherein step of selecting further comprises the step of determining that a difference between the first and second orientations of the communications device is greater than a programmable threshold.

15. The method of claim 14, wherein the step of selecting comprises the step of changing the mode of operation of the communications device from speakerphone mode of operation to handset mode of operation when the processor determines that the communications device has moved from the first orientation to the second orientation.

16. The method of claim 14 further comprising the steps of:
    receiving audio signals from a remote communications device to provide received audio signals;
    amplifying the received audio signals by applying first and second amplifier gains to the amplifier to provide amplified audio signals, wherein the first amplifier gain is applied to the received audio signals when the communications device operates in speakerphone mode and wherein the second amplifier gain is applied to the received audio signals when the communications device operates in handset mode; and
    reproducing sound from the amplified audio signals.

17. The method of claim 14 further comprising the steps of:
    receiving audio signals from a remote communications device to provide received audio signals;
    reproducing sounds from the received audio signals when the communications device operates in handset mode; and
    reproducing sounds from the received audio signals when the communications device operates in speakerphone mode.

18. The method of claim 14 further comprising the steps of:
    receiving audio signals from a remote communications device to provide received audio signals;
    reproducing sounds from the received audio signals when the communications device operates in handset mode; and
    wirelessly transmitting the received audio signals when the communications device operates in speakerphone mode.

19. The method of claim 14 further comprising the steps of:
    providing microphone audio signals in response to sounds, wherein the microphone audio signals are transmitted to the remote communications device when the communications device operates in the handset mode; and
    receiving wireless transmissions when the communications device operates in the speakerphone mode.

20. A method of providing handset mode operation and speakerphone mode operation in a communications device, the method comprising the steps of:
    sensing first and second directions of a gravitational field relative to the communications device in respective first and second orientations of the communications device relative to the gravitational field;
    selecting speakerphone mode of operation for the communications device when the gravitational sensor senses the first direction of the gravitational field relative to the communications device in the first orientation of the communications device relative to the gravitational field and selecting handset mode of operation for the communications device when the gravitational sensor senses the second direction of the gravitational field relative to the communications device in the second orientation of the communications device relative to the gravitational field, wherein the step of selecting comprises the step of changing the mode of operation of the communications device from speakerphone mode of operation to handset mode of operation when the processor determines that the communications device has moved from the first orientation to the second orientation, wherein step of changing comprises the step of determining that a difference between the first and second orientations of the communications device is greater than a programmable threshold.

21. The method of claim 20, wherein the step of determining comprises the step of determining that a difference between the first and second orientations of the communications is greater than a programmable threshold, wherein the programmable threshold is about equal to a 10° change between the first and second directions of the gravitational field relative to the communications device in the respective first and second orientations.

22. A method of providing handset mode operation and speakerphone mode operation in a communications device, the method comprising the steps of:
    receiving audio signals from a remote communications device to provide received audio signals;
    selecting one of handset mode and conference speakerphone mode for the mode of operation of the communications device based on a difference between first and second orientations of the communications device that is greater than a programmable threshold;
    reproducing sounds from the received audio signals when the processor selects handset mode; and
    wirelessly transmitting the received audio signals to an external speakerphone speaker remote from the communications device when the conference speakerphone mode of operation is selected.

23. The method of claim 22 further comprising the steps of:
    sensing first and second directions of a gravitational field relative to the communications device in respective first and second orientations of the communications device relative to the gravitational field;
    selecting conference speakerphone mode of operation for the communications device when sensing the first direction of the gravitational field relative to the communications device in the first orientation of the communications device relative to the gravitational field; and
    selecting handset mode of operation for the communications device when sensing the second direction of the gravitational field relative to the communications device in the second orientation of the communications device relative to the gravitational field.

24. The method of claim 22 further comprising the steps of:
    providing transmit audio signals in response to sounds, wherein the transmit audio signals are transmitted to the remote communications device when the communications device operates in handset mode; and receiving wireless transmissions from an external microphone remote from the communications device, wherein the received wireless transmissions are transmitted to a remote communications device when the conference speakerphone mode of operation is selected.

25. A communications device providing handset mode operation and speakerphone mode operation, the communications device comprising:

means for sensing first and second directions of a gravitational field relative to the communications device in respective first and second orientations of the communications device relative to the gravitational field; and means for selecting speakerphone mode of operation for the communications device when the gravitational sensor senses the first direction of the gravitational field relative to the communications device in the first orientation of the communications device relative to the gravitational field and selecting handset mode of operation for the communications device when the gravitational sensor senses the second direction of the gravitational field relative to the communications device in the second orientation of the communications device relative to the gravitational field, wherein the means for selecting further comprises means for determining that a difference between the first and second orientations of the communications device is greater than a programmable threshold.

26. The communications device of claim 25, wherein the means for selecting comprises means for changing the mode of operation of the communications device from the speakerphone mode of operation to the handset mode of operation when the processor determines that the communications device has moved from the first orientation to the second orientation.

27. The communications device of claim 25 further comprising:

means for receiving audio signals from a remote communications device to provide received audio signals;

means for amplifying the received audio signals by applying first and second amplifier gains to the amplifier to provide amplified audio signals, wherein the first amplifier gain is applied to the received audio signals when the communications device operates in speakerphone mode and wherein the second amplifier gain is applied to the received audio signals when the communications device operates in handset mode; and means for reproducing sounds from the amplified audio signals.

28. The communications device of claim 25 further comprising:

means for receiving audio signals from a remote communications device to provide received audio signals;

means for reproducing sounds from the received audio signals when the communications device operates in handset mode; and means for reproducing sounds from the received audio signals when the communications device operates in speakerphone mode.

29. The communications device of claim 25 further comprising:

means for receiving audio signals from a remote communications device to provide received audio signals;

means for reproducing sounds from the received audio signals when the communications device operates in handset mode; and means for wirelessly transmitting the received audio signals when the communications device operates in speakerphone mode.

30. The communications device of claim 25 further comprising:

means for providing transmit audio signals in response to sounds, wherein the transmit audio signals are transmitted to the remote communications device when the communications device operates in handset mode; and means for receiving wireless transmissions when the communications device operates in speakerphone mode.

31. A communications device providing handset mode operation and speakerphone mode operation, the communications device comprising:

means for sensing first and second directions of a gravitational field relative to the communications device in respective first and second orientations of the communications device relative to the gravitational field; and means for selecting speakerphone mode of operation for the communications device when the gravitational sensor senses the first direction of the gravitational field relative to the communications device in the first orientation of the communications device relative to the gravitational field and selecting handset mode of operation for the communications device when the gravitational sensor senses the second direction of the gravitational field relative to the communications device in the second orientation of the communications device relative to the gravitational field, wherein the means for selecting comprises means for changing the mode of operation of the communications device from the speakerphone mode of operation to the handset mode of operation when the processor determines that the communications device has moved from the first orientation to the second orientation, wherein the means for changing comprises means for determining that a difference between the first and second orientations of the communications device is greater than a programmable threshold.

32. The communications device of claim 31, wherein the means for determining comprises means for determining that a difference between the first and second orientations of the communications is greater than a programmable threshold, wherein the programmable threshold is about equal to a 10° change between the first and second directions of the gravitational field relative to the communications device in the respective first and second orientations.

33. A communications device providing handset mode operation and speakerphone mode operation, the communications device comprising:

means for receiving audio signals from a remote communications device to provide received audio signals;

means for selecting one of handset mode and conference speakerphone mode for the mode of operation of the communications device based on a difference between first and second orientations of the communications device that is greater than a programmable threshold;

means for reproducing sounds from the received audio signals wherein the handset speaker when the processor selects handset mode; and means for wirelessly transmitting the received audio signals to an external speakerphone speaker remote from the communications device when the conference speakerphone mode of operation is selected.

34. The communications device of claim 33 further comprising:
   means for sensing first and second directions of a gravitational field relative to the communications device in respective first and second orientations of the communications device relative to the gravitational field;
   means for selecting conference speakerphone mode of operation for the communications device when sensing the first direction of the gravitational field relative to the communications device in the first orientation of the communications device relative to the gravitational field; and
   means for selecting handset mode of operation for the communications device when sensing the second direction of the gravitational field relative to the communications device in the second orientation of the communications device relative to the gravitational field.

35. The communications device of claim 33 further comprising:
   means for providing transmit audio signals in response to sounds, wherein the transmit audio signals are transmitted to the remote communications device when the communications device operates in handset mode; and
   means for receiving wireless transmissions from an external microphone remote from the communications device, wherein the received wireless transmissions are transmitted to a remote communications device when the conference speakerphone mode of operation is selected.

36. A communications device comprising providing handset mode operation and speakerphone mode operation, said communications device comprising:
   a gravitational sensor, in a housing of the communications device, configured to sense first and second directions of a gravitational field relative to the communications device in respective first and second orientations of the communications device relative to the gravitational field; and
   a processor, in the housing and electrically connected to the gravitational sensor, wherein the processor is configured to select speakerphone mode of operation for the communications device when the gravitational sensor senses the first direction of the gravitational field relative to the communications device in the first orientation of the communications device relative to the gravitational field and is configured to select handset mode of operation for the communications device when the gravitational sensor senses the second direction of the gravitational field relative to the communications device in the second orientation of the communications device relative to the gravitational field.

37. A communications device providing handset mode operation and speakerphone mode operation, said communications device comprising:
   a gravitational sensor that senses first and second directions of a gravitational field relative to the communications device in respective first and second orientations of the communications device relative to the gravitational field; and
   a processor, responsive to the gravitational sensor, that selects speakerphone mode of operation for the communications device when the gravitational sensor senses the first direction of the gravitational field relative to the communications device in the first orientation of the communications device relative to the gravitational field and that selects handset mode of operation for the communications device when the gravitational sensor senses the second direction of the gravitational field relative to the communications device in the second orientation of the communications device relative to the gravitational field, wherein the processor is configured to determine the first orientation of the communications device in response to input to the communications device from a user.

38. The communications device according to claim 37, wherein the input comprises input via a button of the communications device.

39. A wireless user terminal providing handset mode operation and speakerphone mode operation, said wireless user terminal comprising:
   a gravitational sensor, in a housing of the wireless user terminal, configured to sense first and second directions of a gravitational field relative to the wireless user terminal in respective first and second orientations of the wireless user terminal relative to the gravitational field;
   a processor, in the housing of the wireless user terminal and electrically connected to the gravitational sensor, wherein the processor is configured to select speakerphone mode of operation for the wireless user terminal when the gravitational sensor senses the first direction of the gravitational field relative to the wireless user terminal in the first orientation of the wireless user terminal relative to the gravitational field and is configured to select handset mode of operation for the wireless user terminal when the gravitational sensor senses the second direction of the gravitational field relative to the wireless user terminal in the second orientation of the wireless user terminal relative to the gravitational field;
   a wireless transmitter, in the housing of the wireless user terminal, that wirelessly transmits audio signals from the wireless user terminal; and
   a wireless receiver, in the housing of the wireless user terminal, that wirelessly receives audio signals from outside the housing of the wireless user terminal.

40. A wireless user terminal according to claim 39 wherein the mode of operation of the wireless user terminal changes from speakerphone mode of operation to handset mode of operation when the processor determines that the wireless user terminal has moved from the first orientation to the second orientation, wherein the processor determines that a difference between the first and second orientations of the wireless user terminal is greater than a programmable threshold.

41. A wireless user terminal according to claim 40 wherein the programmable threshold is about equal to a 10° change between the first and second directions of the gravitational field relative to the wireless user terminal in the respective first and second orientations.

* * * * *